United States Patent [19]

Hoshi et al.

[11] Patent Number: 5,572,383
[45] Date of Patent: Nov. 5, 1996

[54] MAGNETIC FLOPPY DISC DRIVE RECEIVING TWO DISCS HAVING DIFFERENT SIZES

[75] Inventors: Akio Hoshi, Chichibu; Toru Wakazawa, Saitama; Nobuhiro Aizawa, Chichibu, all of Japan

[73] Assignee: Canon Denshi Kabushiki Kaisha, Saitama, Japan

[21] Appl. No.: 247,116

[22] Filed: May 20, 1994

Related U.S. Application Data

[63] Continuation of Ser. No. 804,383, Dec. 10, 1991, abandoned.

[51] Int. Cl.$^6$ .............. G11B 5/016; G11B 5/012; G11B 17/08; G11B 17/02
[52] U.S. Cl. .............. 360/99.05; 360/97.01; 360/98.07; 360/98.08; 360/99.04; 360/99.12
[58] Field of Search .............. 360/98.07, 98.08, 360/92, 97.01, 99.12; 369/75.2, 264, 265, 99.04, 99.05

[56] References Cited

U.S. PATENT DOCUMENTS

| | | | |
|---|---|---|---|
| 999,097 | 7/1911 | Couade | 369/265 |
| 2,335,661 | 11/1943 | Gay | 369/265 |
| 2,908,541 | 10/1959 | Fomenko | 360/99.08 |
| 4,339,778 | 7/1982 | Wise | 360/98.07 |
| 4,383,283 | 5/1983 | Machut | 360/106 |
| 4,755,978 | 7/1988 | Takizawa et al. | 369/37 |
| 4,773,036 | 9/1988 | Berens et al. | 364/900 |
| 4,984,149 | 1/1991 | Iwashita et al. | 364/200 |

FOREIGN PATENT DOCUMENTS

| | | |
|---|---|---|
| 58-211376 | 12/1983 | Japan . |
| 1-150271 | 6/1989 | Japan . |

*Primary Examiner*—John H. Wolff
*Assistant Examiner*—David D. Davis
*Attorney, Agent, or Firm*—Spencer & Frank

[57] ABSTRACT

A disc drive device includes a base, a rotary member rotatably supported on the base and a first chucking mechanism for holding a first kind of disc-shaped recording medium while coinciding a rotational center of the first kind of recording medium with a rotational center of the rotary member. The first chucking mechanism is arranged at one end of the rotary member. A second chucking mechanism holds a second kind of disc-shaped recording medium different from the first kind of recording medium with respect to size or disc formatting while coinciding a rotational center of the second kind of recording medium with a rotational center of the rotary member. The second chucking mechanism is arranged at the other end of the rotary member. A driving mechanism is mounted on the base for driving the rotary member.

9 Claims, 12 Drawing Sheets

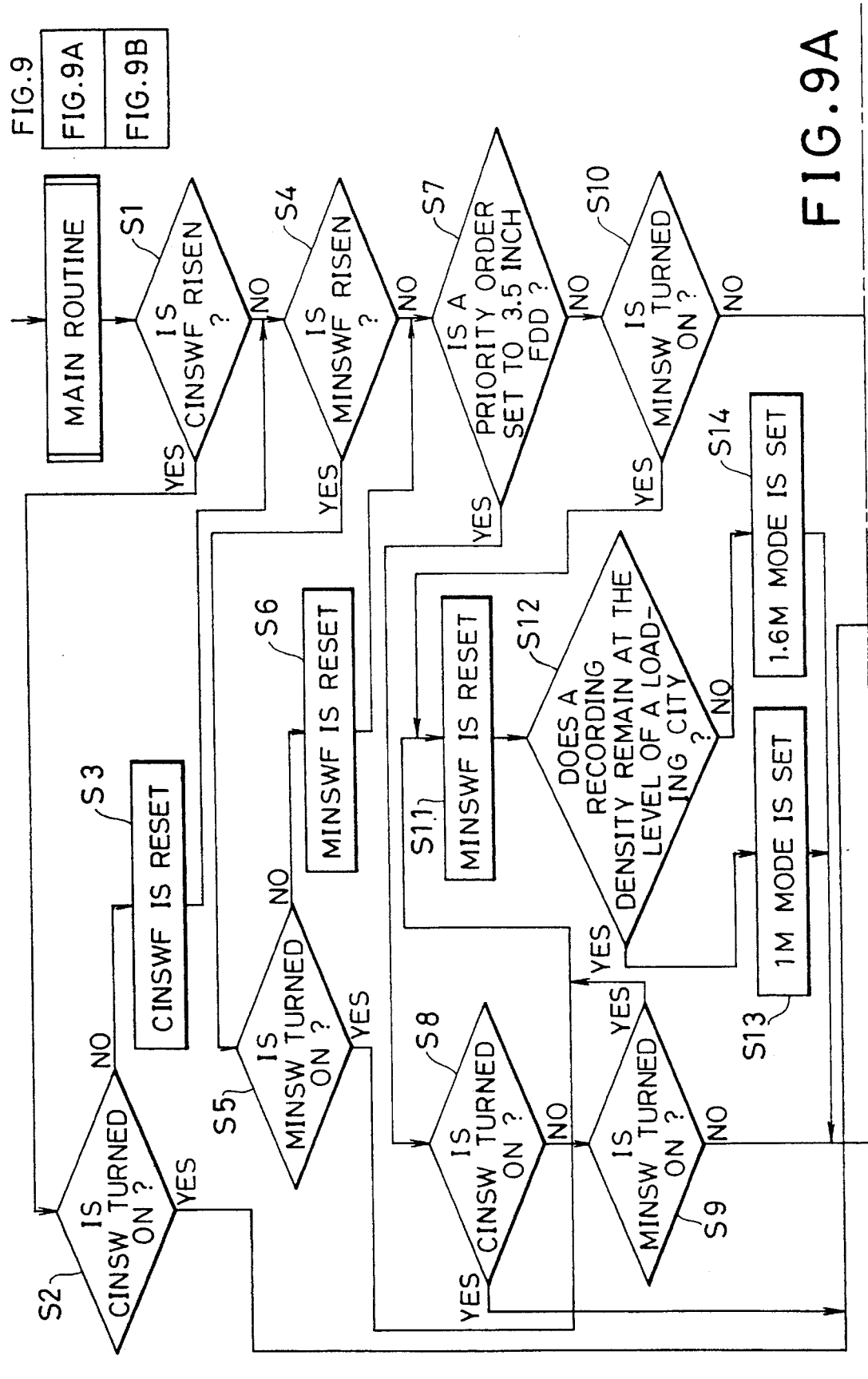

MAGNETIC FLOPPY DISC DRIVE RECEIVING TWO DISCS HAVING DIFFERENT SIZES

This application is a continuation of application Ser. No. 07/804,383, filed Dec. 10, 1991 (now abandoned).

BACKGROUND OF THE INVENTION

1. Field of the Invention

The present invention relates generally to a recording/reproducing device. More particularly, the present invention relates to a recording/reproducing device in the form of a disc drive device for rotationally driving a disc-shaped rotary recording medium (hereinafter referred to simply as a disc) to perform an information recording/reproducing operation using the disc.

2. Description of the Prior Art

To perform an information recording/reproducing operation using a flexible magnetic disc that is called a floppy disc (hereinafter referred to simply as an FD) serving as a rotational magnetic recording medium, a floppy disc drive device (hereinafter referred simply to as an FDD) has been hitherto used. As is well known, various kinds of office automation devices, apparatuses or the like have been remarkably developed in recent years. Similarly, FDDs each serving as an exterior memorizing device have accomplished remarkable development especially in respect of their design and construction in smaller dimensions accompanied by an enlarged capacity. In this connection, proposals have been made with respect to various kind of FDs for FDDs some of which are standardized at present. Among them, FD having a diameter of 8 inches, FD having a diameter of 5.25 inches and FD having a diameter of 3.5 inches have been widely put in practical use.

Recently, two FDDs each serving as an exterior memorizing device are often used for an office automation apparatus such as a word processor, a personal computer or the like. For example, with respect to a word processor, two FDDs are practically used in such a manner that one of them is employed for the purpose of reproducing a control program that is called a system soft for the word processor and then feeding a central processing unit of a main body of the word processor with the reproduced control program and other one is employed for the purpose of memorizing and storing data, e.g., documents created by operating the word processor.

However, when two same FDDs are arranged in parallel with each other, there arise drawbacks that a wide space is required for arrangement of them and a quantity of consumption of electricity is undesirably increased because a driving motor for driving an FD in each FDD consumes electricity.

To obviate the foregoing drawbacks, a proposal has been made as disclosed in Japanese Patent Application Laying-open No. 211376/1983. According to this prior invention, a so-called dual FDD is employed such that a single driving motor serving as a common driving power supply source to two FDDs is installed to rotationally drive two FDs.

However, since the conventional dual FDD is constructed such that the same kind of two FDDs are integrated with each other, an information recording/reproducing operation can be performed only for the same kind of FDs arranged in the both FDDs. For example, with respect to FD having a diameter of 5.25 inches (hereinafter referred to simply as a 5-inch FD), an information recording/reproducing operation can be performed only with 5-inch FDs. For this reason, there appear the following inconveniences under the current circumstance of various kinds of FDs widely used in many office automation apparatuses.

For example, when documents are created by using a 5-inch FD having a system soft widely employed for word processors and stored therein, they cannot be recorded and stored in a 3.5-inch FD. In addition, a system soft or data stored in the 5-inch FD cannot be transferred to the 3.5-inch FD and vice versa. In other words, a so-called dubbing operation cannot be performed between 5-inch FD and 3.5-inch FD. If there arises an unavoidable necessity for performing a dubbing operation, two FDDs, i.e., FDD for 3.5-inch FD and FDD for 5-inch FD should be prepared. This leads to the same drawbacks as mentioned above that a wide space is required for arrangement of two FDDs, and moreover, a large quantity of electricity is consumed.

To obviate these drawbacks, another proposal has been made as disclosed in Japanese Patent Application Laying-open No. 150271/1989. According to this prior invention, a single common driving power supply source to two FDs is arranged in FDD so as to make it possible to drive 3.5-inch FD and 5-inch FD only with a single driving motor. However, since the FDD is constructed such that a chucking mechanism for 3.5-inch FD and a chucking mechanism for 5-inch FD are arranged in a simply overlapped relationship, there remains still a problem in respect of design and construction of the FDD in smaller dimensions because of thickness of the FDD, although the FDD has an advantage that different kinds of recording media can be driven with a single driving power supply source.

Another drawback of the above proposal is that a recording medium having a smaller diameter should more deeply be inserted into the FDD, since different kinds of recording media, i.e., recording media each having a different diameter are rotationally driven about a common rotational center. To obviate this drawback, an insert slit on a front panel should be enlarged so as to enable a recording medium having a smaller diameter to be deeply inserted into the FDD with an operator's hand. Otherwise, a mechanism for automatically conveying a recording medium having a smaller diameter by utilizing rollers or the like should additionally be arranged in the FDD.

SUMMARY OF THE INVENTION

The present invention has been made with the foregoing background in mind.

An object of the present invention is to provide a disc drive device for performing an information recording/reproducing operation using different kinds of media each having a different diameter wherein the disc drive device is constructed in smaller dimensions inclusive of a reduced thickness.

Other object of the present invention is to provide a disc drive apparatus of the foregoing type wherein common components to the different kinds of media are utilized for a rotary part of each medium and the number of components can be reduced substantially.

Another object of the present invention is to provide a disc drive device of the foregoing type wherein each medium can easily be inserted into the disc drive device, resulting in maneuverability of the disc drive device being improved substantially.

According to a first aspect of the present invention, there is provided a disc drive device which comprises a base; a rotary member rotatably supported on the base; first holding means for holding one kind of disc-shaped recording medium while coinciding a rotational center of the recording medium with a rotational center of the rotary member, the first holding means being arranged at one end of the rotary member; second holding means for holding other kind of disc-shaped recording medium different from the kind of the first-mentioned recording medium while coinciding a rotational center of the last-mentioned recording medium with a rotational center of the rotary member, the second holding means being arranged at other end of the rotary member; and driving means mounted on the base to drive the rotary member.

In addition, according to a second aspect of the present invention, there is provided a disc drive device which comprises a base; a first rotary member and a second rotary member each rotatably supported on the base; first holding means for holding one kind of disc-shaped recording medium while coinciding a rotational center of the recording medium with a rotational center of the first rotary member, the first holding means being arranged at one end of the first rotary member; second holding means for holding other kind of disc-shaped recording medium having a diameter different from that of the first-mentioned recording medium while coinciding a rotational center of the last-mentioned recording medium with a rotational center of the rotary member, the second holding means being arranged at one end of the second rotary member; driving means for driving the first rotary member and the second rotary member; and the first rotary member and the second rotary member being spaced away from each other by a distance substantially equal to a half of difference in diameter between the first-mentioned recording medium and the last-mentioned recording medium.

Additionally, according to a third aspect of the present invention, there is provided a disc drive device including a plurality of drive units, wherein the disc drive device includes common controlling means to the respective drive units, the controlling means being constructed such that in a case where a single drive unit having a disc placed thereon is arranged in the disc drive device, the disc drive unit is selected and then controlled, in a case where a plurality of drive units each having a disc placed thereon are arranged in the disc drive device, a drive unit having a disc early placed thereon is selected with a priority, and in a case where a plurality of drive units having discs simultaneously placed thereon are arranged in the disc drive device, the drive units to be controlled in accordance with a present priority order are successively selected.

Other objects, features and advantages of the present invention will readily become apparent from reading of the following description which has been made in conjunction with the accompanying drawings.

BRIEF DESCRIPTION OF THE DRAWINGS

The present invention is illustrated in the following drawings in which:

FIGS. 9A and 9B are flowcharts which schematically illustrate a control algorithm employable for the disc drive device in FIG. 1;

DETAILED DESCRIPTION OF PREFERRED EMBODIMENTS

Now, the present invention will be described in detail hereinafter with reference to the accompanying drawings which illustrate preferred embodiments of the present invention.

Figure 6:
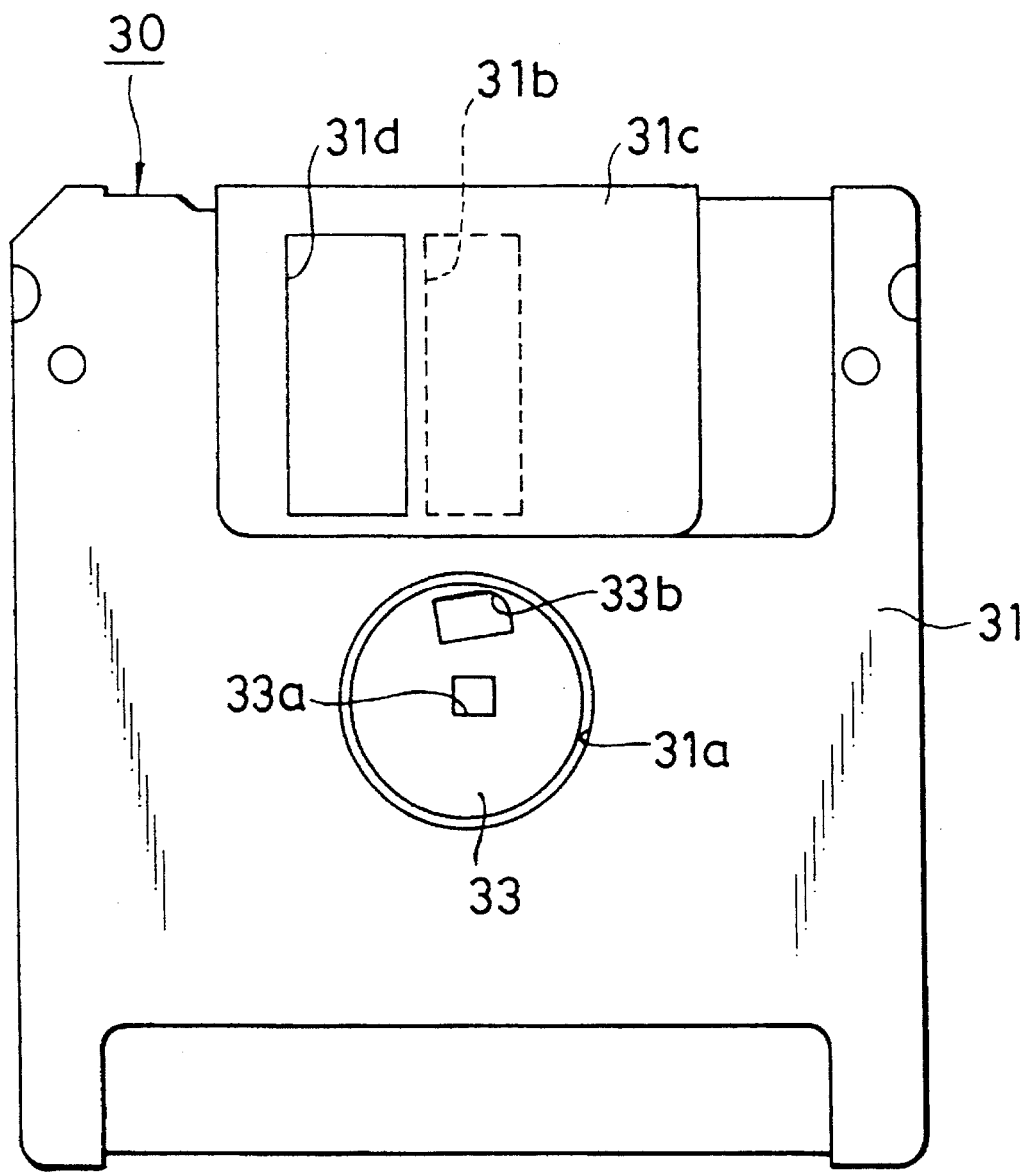
FIG. 6 is a plan view which shows the structure of a floppy disc having a diameter of 3.5 inches.
Figure 7:
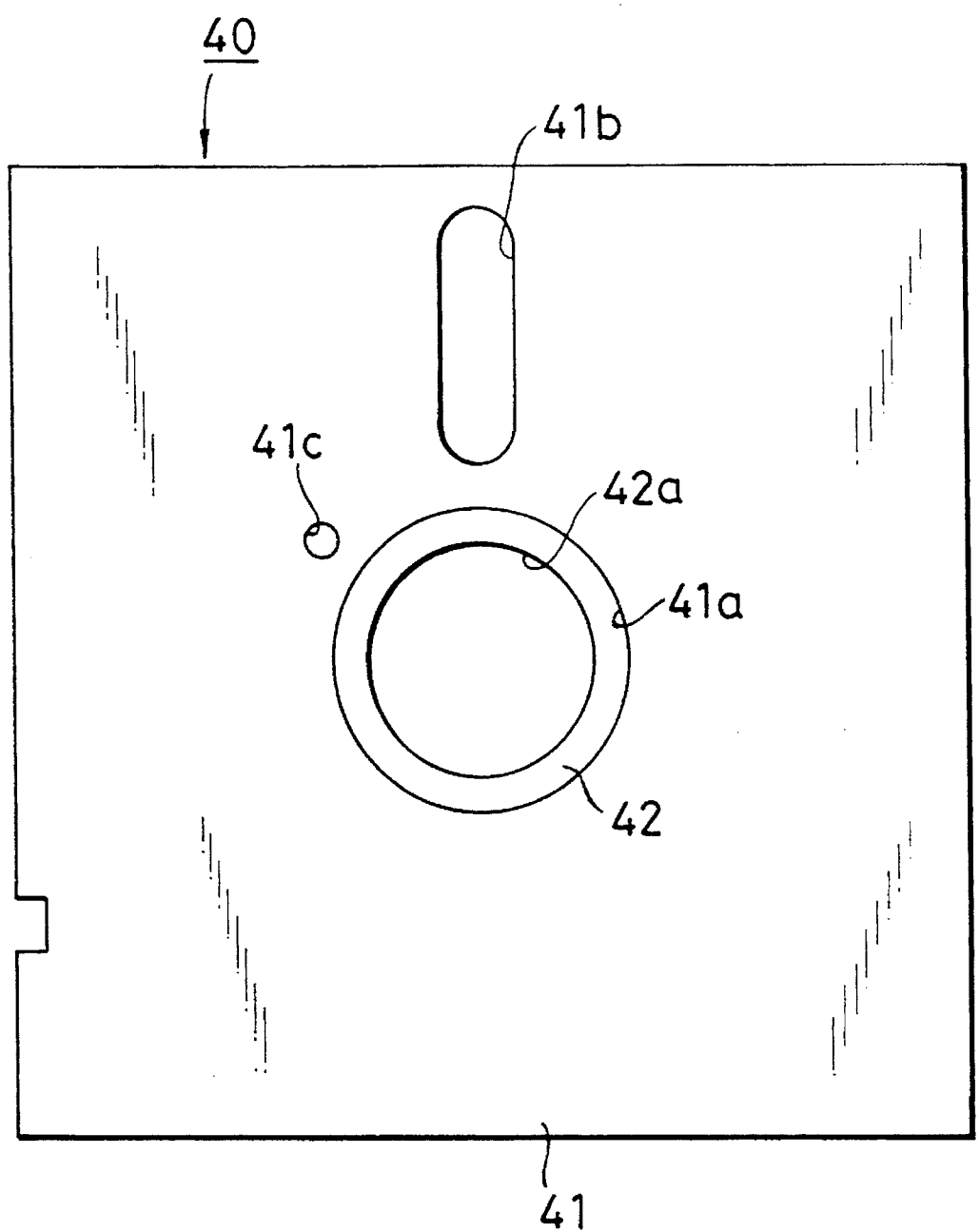
FIG. 7 is a plan view which shows the structure of a floppy disc having a diameter of 5.25 inches.

It should be noted that the present invention will be first described below with respect to an embodiment wherein a floppy disc device of the present invention (hereinafter referred simply as an FDD) performs a magnetic recording/reproducing information using a floppy disc having a diameter of 3.5 inches (hereinafter floppy disc having a 3.5 inches FD) as shown in FIG. 6 as well as a floppy disc having a diameter of 5.25 inches (hereinafter referred to simply as a 5-inch FD) as shown in FIG. 7. To facilitate understanding of the present invention, the FDs shown in FIG. 6 and FIG. 7 will be described below prior to description of the FDD in accordance with the embodiment of the present invention.

A 3.5-inch FD 30 shown in FIG. 6 is constructed such that a flexible magnetic disc 32 (see FIG. 2) is rotatably received in a cassette 31 molded of a comparatively hard synthetic resin. The 3.5-inch FD 30 is provided with a center hub 33 made of magnetic metallic material at the central part of the magnetic disc 32, and a flange portion 33c (see FIG. 2) of the center hub 33 is adhesively secured to the magnetic disc 32. As is apparent from FIG. 6, the center hub 33 is exposed to the outside via a circular opening portion 31a which is formed on the lower surface of the cassette 31 at the central part of the same. A substantially square hole 33a is formed at the central part of the center hub 33 so s to allow a spindle shaft 20 to be fitted thereinto at the time of a chucking operation to be described later. In addition, a substantially rectangular hole 33b is formed at a position in the vicinity of the hole 33a so as to allow a positioning pin 34 to be described later to be likewise fitted thereinto at the time of the chucking operation.

On the other hand, in addition to the central opening portion 31a, a rectangular opening portion 31b is formed on the cassette 31 so that a magnetic head to be described later comes in slidable contact with the magnetic disc 32 at the time of a recording/reproducing operation. A shutter 31c including an opening portion 31d for opening or closing the opening portion 31b is slidably attached to the cassette 31.

Next, a 5-inch FD 40 shown in FIG. 7 is constructed such that a magnetic disc 42 having a circular hole 42a formed at the central part thereof is rotatably received in an envelope 41. A circular opening 41a is formed at the central part of the envelope 41 so that the inner peripheral part of the hole 42a of the magnetic disc 42 is exposed to the outside via the opening portion 41a. In addition, an elongated opening portion 41b and an index detection hole 41c are formed on the envelope 41. It should be noted that the opening portion 41 is intended for allowing a magnetic head to come in slide contact with the magnetic disc 42.

Next, an FDD for performing a magnetic information recording/reproducing operation using a 3-inch FD 30 as well as a 5-inch FD 40 as mentioned above in accordance with the embodiment of the present invention will be described below.

FIG. 1 to FIG. 5 illustrate an FDD in accordance with the embodiment of the present invention.

Figure 1:
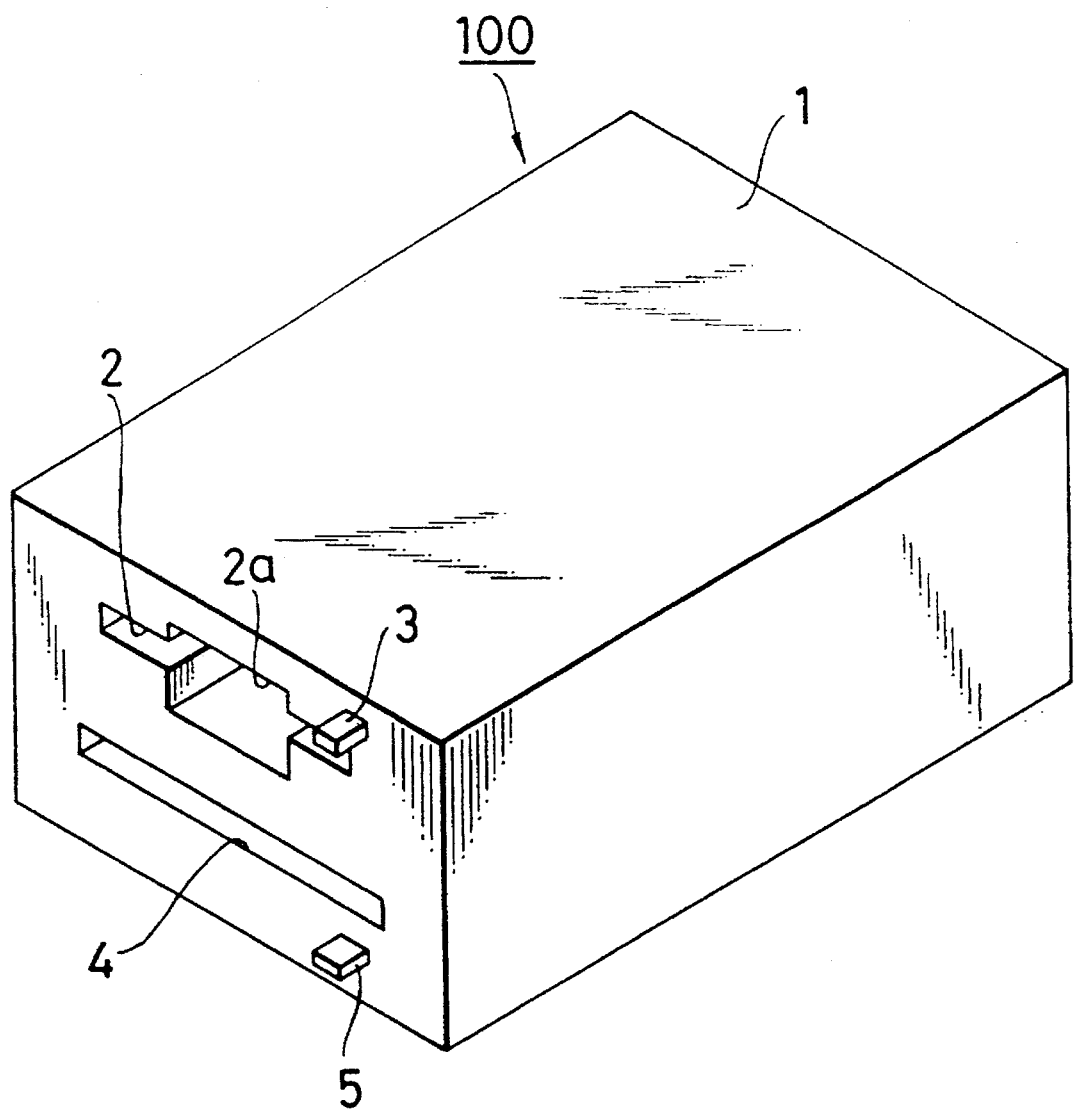
FIG. 1 is a perspective view which shows the whole appearance of a disc drive device in accordance with an embodiment of the present invention.

FIG. 1 is a perspective view of the FDD, particularly illustrating the whole appearance of the same. In FIG. 1, the FDD is generally designated by reference numeral 100. Specifically, the FDD 100 is constructed in an integral structure comprising an FDD for performing a recording/reproducing operation using a 3.5-inch FD 30 shown in FIG. 6 and an FDD for performing a recording/reproducing operation using a 5-inch FD 40 shown in FIG. 7. A disc insert slit 2 for inserting a 3.5-inch FD 30 therethrough, an eject button 3 for ejecting the 3.5-inch FD 30, a disc insert slit 4 for inserting a 5-inch FD 40 therethrough and an eject button 5 for ejecting the 5-inch FD are arranged on the front panel of an exterior cover 1 of the FDD 100. To facilitate insertion of the 3.5 -inch FD 30, an opening portion 2a having a wide width is additionally formed at the central region of the disc insert slit 2. With such construction as mentioned above, the FDD 100 serves to magnetically record or reproduce information using a 3.5 -inch FD 30 inserted through the disc insert slit 2 as well as a 5-inch FD 40 inserted through the disc insert slit 4.

Figure 2:
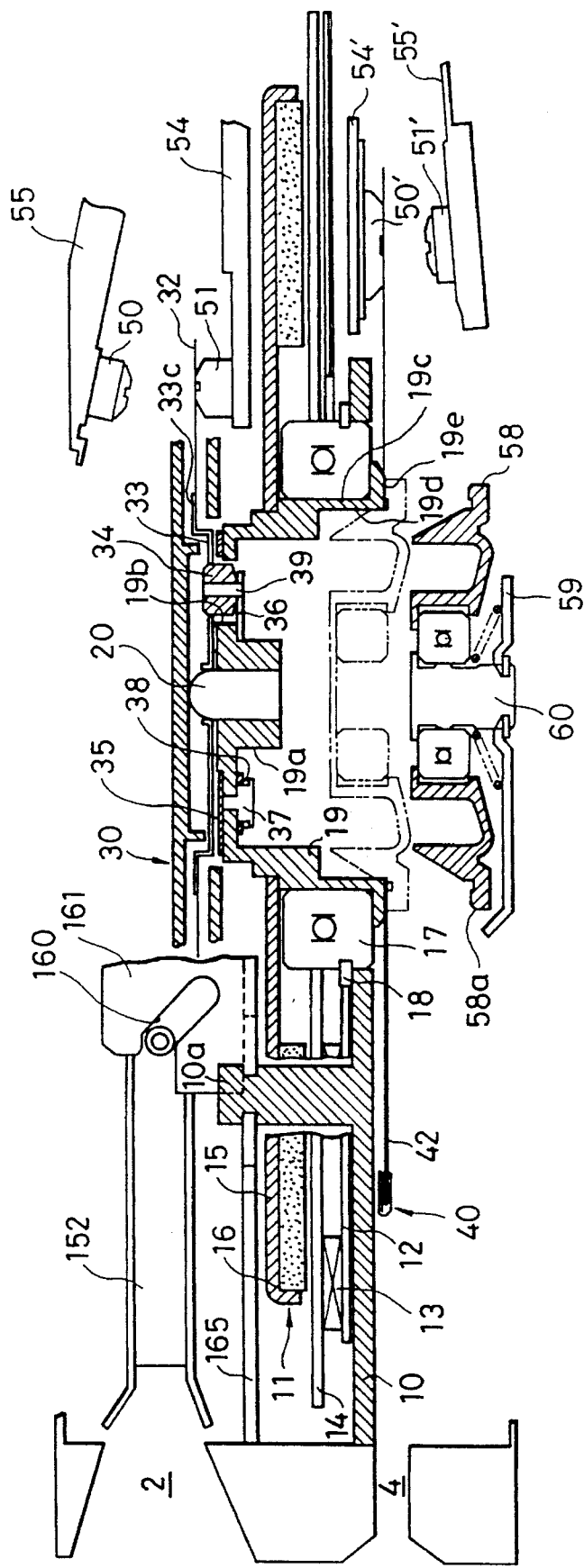
FIG. 2 is a fragmentary sectional side view of the disc drive device in FIG. 1, particularly showing the structure of rotational driving sections for two floppy discs each having a different diameter.

In addition to a drive section for performing a recording/reproducing operation using a 3.5 -inch FD (hereinafter referred to simply as a 3.5 -inch drive section) and a drive section for performing a recording/reproducing operation using a 5-inch FD (hereinafter referred to simply as a 5-inch drive section), the FDD which includes a rotational drive section for rotationally driving a 3.5 -inch FD 30 as well as a 5-inch FD 40 is constructed in operative association with the 3.5-inch drive section and the 5-inch drive section, as shown in FIG. 2. The rotational drive section includes a single driving motor 11 serving as a common driving power supply source to the 3.5 -inch drive section and the 5-inch drive section so that the driving motor 11 rotationally drives a magnetic disc 32 of the 3.5-inch FD 30 and a magnetic disc 42 of the 5-inch FD 40. The detailed structure of the rotational drive section will be described below.

In FIG. 2, reference numeral 10 designates a base for supporting respective components constituting the FDD 100. The respective components constituting the FDD 100 are mounted on the base 10.

Next, the structure of the driving motor 11 for rotating the 3.5 -inch FD 30 and the 5-inch FD 40 will be described below. In FIG. 2, reference numeral 12 designates a stator which is fixedly mounted on the base 10. A drive coil 13 fixedly mounted on a printed circuit board 14 placed on the base 10 is arranged on the stator 12 with an electrical insulating layer interposed therebetween. A stator section for the driving motor 11 is constructed using the aforementioned components. On the other hand, a rotor section for the driving motor 11 is arranged opposite to the stator section. The rotor section is essentially composed of a rotor 16 and a permanent magnet 15 immovably secured to the rotor 16, and the permanent magnet 15 is arranged opposite to the drive coil 13 with a predetermined distance therebetween. The rotor 16 is fixedly mounted on a sleeve-shaped rotary member 19 which includes chucking mechanisms at the opposite ends for holding the both magnetic discs 32 and 42. To rotatably hold the rotary member 19, a bearing 17 is interposed between the base 10 and the rotary member 19 in such a manner that its outer race is fixedly placed on the base 10 with the aid of a stop ring 18, while its inner race is firmly fitted to the outer surface of the rotary member 19. It should be added that the stop ring 18 is firmly placed on the base 10 by employing a hitherto known method which is not described herein for the purpose of simplification.

The rotary member 19 will be described in more detail in the following.

As mentioned above, the rotary member 19 is provided with mechanisms at the opposite ends thereof for holding and rotationally driving the 3.5-inch magnetic disc 32 and the 5-inch magnetic disc 42, respectively. Since the mechanism for holding and rotationally driving the 3.5 -inch magnetic disc 32 includes a spindle shaft 20 and a driving pin 34 for the reason based on its structure, a plane portion is inevitably required for holding the spindle shaft 20 and the driving pin 34. On the other hand, with respect to the mechanism for holding and rotationally driving the 5-inch magnetic disc, a circular opening portion is inevitably required for the reason based on its structure. Therefore, the rotary member 19 is designed in the sleeve-shaped configuration, more exactly, in the substantially inverted cup-shaped or hat-shaped configuration having a circular bottom in such a manner its one end is fully closed but its other end is kept open to the outside. To firmly hold the both magnetic discs 32 and 42, chucking mechanisms are arranged at the opposite ends of the rotary member 19.

A chucking mechanism for holding the 3.5 -inch FD 32 is arranged on a closed portion (hereinafter referred to as a spindle hub) 19a of the rotary member 19. Specifically, a spindle shaft 20 for properly locating the 3.5 -inch FD 30 is fixedly inserted through the central part of the spindle hub 19a so that it is fitted into the central square hole 33a (see FIG. 6) of the 3.5 -inch FD 30. In addition, an attractive magnet 35 is fixedly placed on the upper surface of the spindle hub 19a for the purpose of firmly holding the center hub 33 of the 3.5-inch FD 30 by the magnetic attractive force of the magnet 35. Additionally, a support plate 36 is displaceably secured to the lower surface of the spindle hub 19a so as to freely swing relative to the upper surface of the center hub 33 while it is immovably held by a boss 37 integrated with the spindle hub 19a. A coil spring 38 is interposed between a boss 37 and the support plate 36 for the purpose of facilitating the swinging movement of the support plate 36. A positioning pin 34 rotatably held on a shaft 39 fixedly mounted on the support plate 36 to serve as a drive pin is secured to the support plate 36 at its free end. The positioning pin 34 projecting upward from the upper surface of the spindle hub 19a through a hole 19b is normally biased in the upward direction as seen in FIG. 2 by the resilient force of the coil spring 38.

On the other hand, a spindle portion 19c for holding the magnetic disc 42 of the 5-inch FD 40 is arranged on the opposite side to the spindle hub 19a. The spindle portion 19c is designed in the circular disc-shaped configuration having a large cylindrical recess 19d on the lower side as seen in FIG. 2. The hat-shaped rotary member 19 may be made of a metallic material. Alternatively, it may be molded from a synthetic resin.

With such construction of the chucking mechanisms as described above, fitting and holding operations, i.e., chucking and clamping operations for the magnetic disc 32 of the 3.5-inch FD 30 and the magnetic disc 42 of the 5-inch FD 40 are performed in the following manner.

First, a chucking operation for the magnetic disc 32 of the 3.5-inch FD 30 will be described below. As a loading mechanism (not shown) is actuated, the 3.5-inch FD 30 is placed on the spindle hub 19a. Subsequently, the spindle shaft 20 is fitted into the square hole 33a at the central part of the center hub 33 made of a magnetic metallic material which in turn is displaced toward the magnet 35 by the magnetic attractive force of the magnet 35. At the same time, the driving motor 11 is rotationally driven so that the rotary member 19 is rotated, causing the positioning pin 34 to be rotated. When the position of the positioning pin 34 coincides with the position of the hole 33b on the center hub 33, the positioning pin 34 is fitted into the hole 33b to come in engagement with the same. As the inner edge of the hole 33b is squeezed by the positioning pin 34, the inner edge of the square hole 33a on the center hub 33 is brought in engagement with the spindle shaft 20, whereby the center of the center hub 33, i.e., the center of the magnetic disc 31 is aligned with the spindle shaft 20 with the result that the center hub 33 is held properly. This means that the magnetic disc 32 is held properly.

On the other hand, when the magnetic disc 42 of the 5-inch FD 40 is to be clamped, a loading mechanism (not shown) is actuated so as to allow the 5-inch FD disc 40 to be displaced to the position shown in FIG. 2. At this time, the inner periphery of the opening portion 42a at the central part of the magnetic disc 42 comes in contact with a lower end surface 19e extending around the inner periphery of the downward projected part of the spindle portion 19c.

Subsequently, as the clamping mechanism (not shown) is actuated, a collet 58 to serve as a clamping member is displaced from the lower position represented by solid lines to the position represented by phantom lines, whereby it is fitted into the recess 19d of the spindle portion 19c through the opening portion 42a at the central part of the magnetic disc 42. As the inner periphery of the opening portion 42a is squeezed by the collet 58, the center of the magnetic disc 42 coincides with the center of the collet 58. Then, a flange portion 58a of the collet 58 serves to allow the inner peripheral part of the magnetic disc 42 extending around the opening portion 42a to come in close contact with the lower end surface 19e of the spindle portion 19c. Thus, the magnetic disc 42 is firmly held by clamping its inner peripheral part between the flange portion 58a and the spindle port ion 19c.

As mentioned above, the bearing 17 is arranged adjacent to the lower end surface 19e of the spindle portion 19c. Since arrangement of the bearing 17 in this way causes the thrust force generated during the clamping operation performed for the 5-inch FD 40 to be borne by the bearing 17 via the lower end surface 19e of the spindle portion 19c, the rotary member 19 is reliably held against the foregoing thrust force. In addition, according to the embodiment of the present invention, since the rotary member 19 is held around its maximum diameter portion, a quantity of planar deviation of the chucking mechanism induced due to fluctuation of rotation of the rotary member 19 can be reduced. Further, since the lower surface 19e of the rotary member 19 extends to the region around the substantially central part of the bearing 17 while covering the same therewith, undesirable outflow of a grease filled in the bearing 17 can be prevented.

The magnetic disc 32 of the 3.5-inch FD 30 is held on the spindle hub 19a of the rotary member 19, while the magnetic disc 42 of the 5-inch FD 40 is held beneath the spindle portion 19c of the rotary member 19 in the above-described manner, whereby the both magnetic discs 32 and 42 are rotationally driven by the common driving motor 11 to them. Then, one magnetic head is brought in slidable contact with the upper surface of the magnetic disc 32 and another magnetic head is likewise brought in slidable contact with the lower surface of the magnetic disc 42 so that information are magnetically recorded on or reproduced from the magnetic discs 32 and 42.

Next, description will be made below with respect to a head seek mechanism which is arranged in each of the 3.5-inch drive section in which a recording/reproducing operation is performed using the 3.5-inch FD 30 and the 5-inch drive section in which recording/reproducing operation is performed using the 5-inch FD 40 so that each of the magnetic heads is displaced to a certain track position on each of the magnetic discs 32 and 42 while the both magnetic heads are supported by their head seek mechanism.

Figure 3:
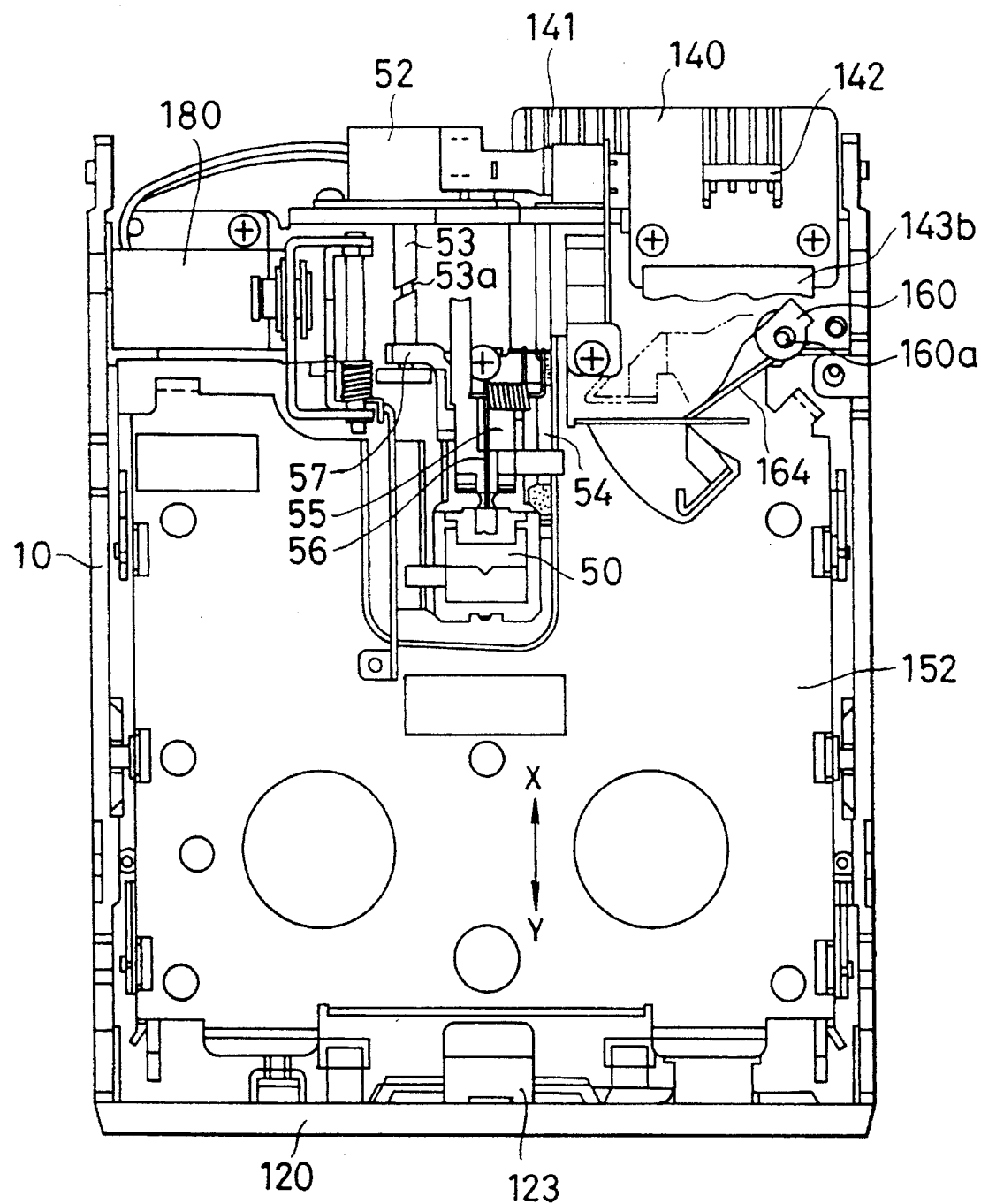
FIG. 3 is an exploded plan view of the disc drive device in FIG. 1 as seen from above, particularly showing the structure of a driving section for a floppy disc having a diameter of 3.5 inches.

FIG. 3 is an exploded plan view of the head seek mechanism for the 3.5-inch drive section as seen from above.

Figure 5:
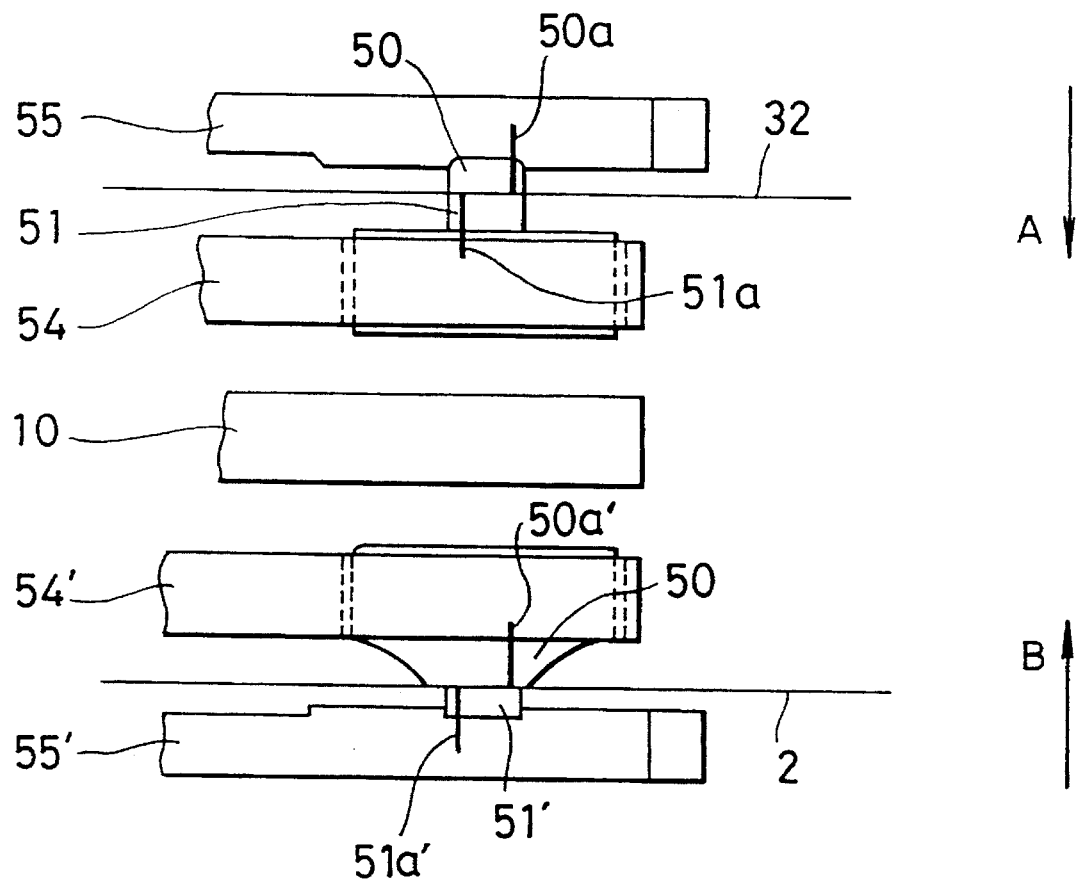
FIG. 5 is an enlarged fragmentary side view of the disc drive device, particularly showing arrangement of magnetic heads and associated components in the disc drive device.

In FIG. 3, reference numeral 54 designates a carriage for displacing a magnetic head while supporting the same. The carriage 54 is movably arranged to move in the radial direction of the magnetic disc 32, i.e, in arrow X direction or in arrow Y direction on the base 10 for the FDD. As shown in FIG. 5, a magnetic head 51 is installed on the upper surface of the carriage 54 at the foremost end of the same so as to perform a recording/reproducing operation using the magnetic disc 32 of the 3.5-inch FD 30 across the lower surface of the same.

In addition, an arm 55 is movably arranged above the carriage 54 to slidably move in the direction of approaching toward the carriage 54 as well as in the direction of aparting away from the same. In this connection, it should be noted that the arm 55 is normally biased in the direction of approaching toward the carriage 54 (in arrow A direction in FIG. 5). Additionally, a magnetic head 50 is installed on the lower surface of the arm 55 at the foremost end of the same so as to perform a recording/reproducing operation using the magnetic disc 32 of the 3.5-inch FD 30 across the upper surface of the same. Therefore, the magnetic head 50 is arranged opposite to the magnetic head 51 such that it is brought in pressure contact with the magnetic disc 32 by the biasing force of a spring 56 so as to clamp the magnetic disc 32 in cooperation of the magnetic head 50 with the magnetic head 51.

On the other hand, as shown on the left side of FIG. 3, a pin 57 is mounted on the carriage 54 at the rear end part of the same, and a spirally extending groove 53a is operatively engaged with the pin 57. It should be added that the groove 53a is formed on a lead screw 53 which is connected directly to the rotational output shaft of a stepping motor 52 to serve as a driving power supply source for driving the carriage 54.

With this construction, as the lead screw 53 is rotationally driven by the stepping motor 52, the pin 57 is squeezed by the groove 53a on the lead screw 53 so that the carriage 54 is driven in arrow X direction or in arrow Y direction and the magnetic heads 50 and 51 are displaced in arrow X direction or in arrow Y direction.

Figure 4:
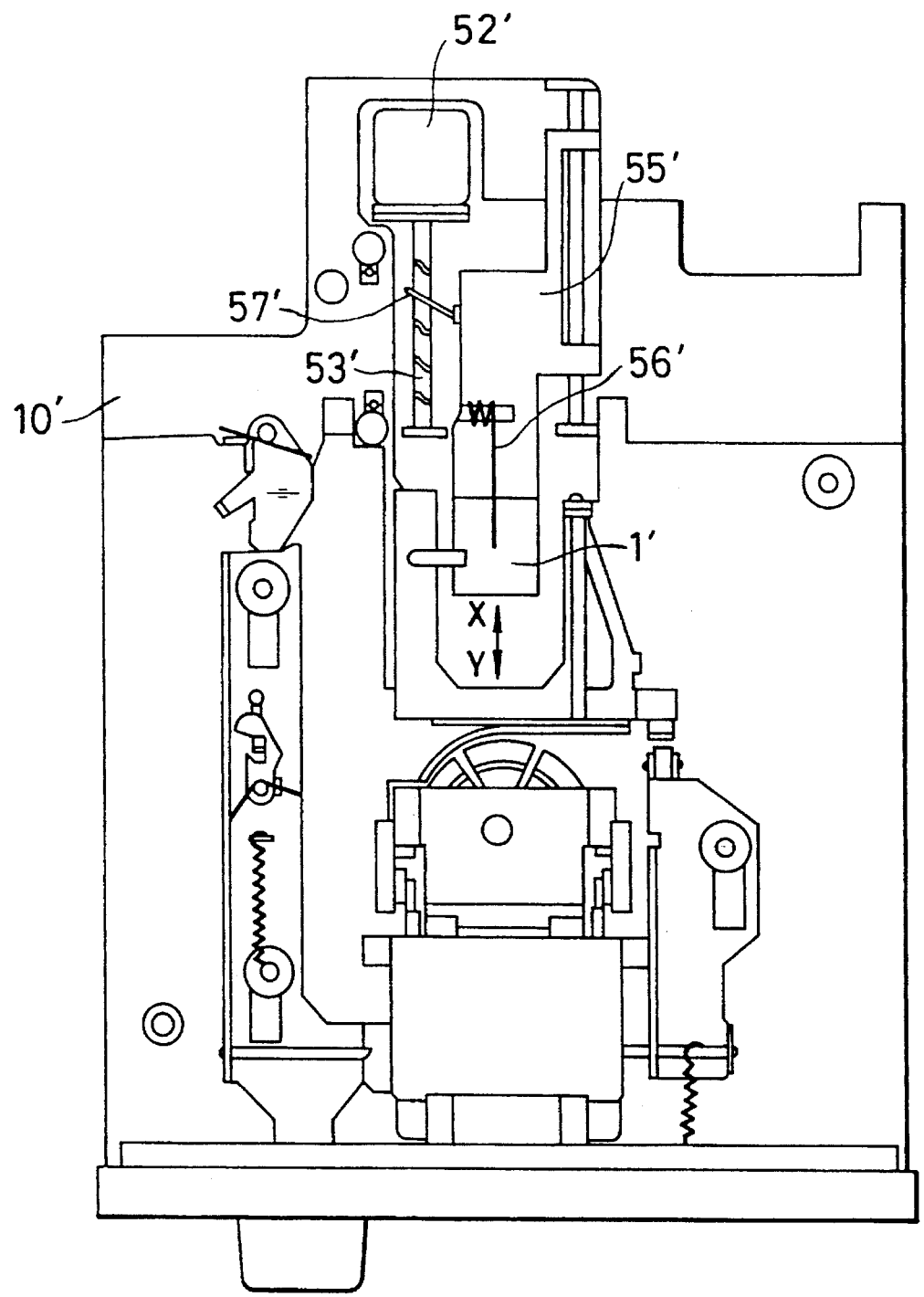
FIG. 4 is an exploded plan view of the disc drive device in FIG. 1 as seen from below, particularly showing the structure of a driving section for a floppy disc having a diameter of 5.25 inches.

On the other hand, a head seek mechanism for the 5-inch drive section is constructed as illustrated in FIG. 4 that is a plan view of the 5-inch drive section as seen below. The head seek mechanism for the 5-inch drive section is essentially coincident with that for the 3.5 -inch drive section with the exception that the former is different from the latter in size, and components constituting the former corresponding to those constituting the latter are represented by same reference numerals each accompanying a dash mark. It should be noted that the positional relationship between the carriage 54' and the arm 55' as seen in the vertical direction is inverted relative to the 3.5 -inch drive section such that the arm 55' is arranged below the carriage 54'. In addition, the arm 55' is normally biased in the opposite direction to arrow A direction, i.e., in arrow B direction.

Also in a case of the head seek mechanism for the 5-inch drive section, as a lead screw 53' is rotationally driven by a stepping motor 52', the carriage 54' is driven in arrow X direction as well as in arrow Y direction via a pin 57' and the magnetic heads 50' and 51' are displaced in arrow X direction as well as in arrow Y direction in the same manner as in a case of the 3.5 -inch drive section.

Since each head seek mechanism is constructed in the above-described manner, the magnetic heads 50, 51, 50' and 51' operatively associated with the 3.5-inch drive section and the 5-inch drive section are displaced in arrow X direction as well as in arrow Y direction to reach certain track positions on the magnetic discs 32 and 42, whereby the magnetic heads 50, 51. 50 ' and 51' are brought in slidable contact with the magnetic discs 32 and 42 with the aid of the rotational drive section shown in FIG. 2 so as the allow information to be magnetically recorded on and reproduced from the magnetic discs 32 and 42.

In FIG. 5, reference numerals 50a, 51a, 50a' and 51a' each designates a position where a recording/reproducing operation is performed by each magnetic head with a certain positional gap. As is apparent from the drawing, the positions of the recording/reproducing gaps 50a and 50a' on the upper magnetic heads 50 and 50' correspond to each other, while the positions of the recording/reproducing gaps on the lower magnetic heads 51 and 51' likewise correspond to each other. This is because the magnetic heads 50 and 50' exhibit the same function and the magnetic heads 51 and 51' likewise exhibit the same function. In addition, especially in a case where a 5-inch FD 40 is inserted into the 5-inch drive section located on the lower side, arrangement of the aforementioned receiving/regenerating gaps 50a, 50a' 51a and 51a' is intended to enable operator to insert the 5-inch FD 40 into the 5-inch drive section in the same direction as in a case where it is inserted into an ordinary 5-inch FDD.

According to the embodiment of the present invention, a loading mechanism for a 3.5 -inch cassette is mounted on the base 10, and a positioning pin designated by reference numeral 10a in FIG. 2 to be used during a cassette loading operation is formed in an integral structure by cutting out a part of the base 10 from the rear surface side with the aid of a press machine, whereby an accuracy for positioning each magnetic disc can be improved and a structure of each drive section can be simplified. Additionally, a cassette guide 152 constituting a part of the cassette loading mechanism and a cam groove 160 for guiding slantwise downward displacement of the cassette guide 152 are supported on a side plate 161 which is formed by cutting out a part of the base 10 in the same manner as mentioned above. This leads to the result that the FDD is simply constructed in smaller dimensions inclusive of a reduced thickness. In FIG. 2, reference numeral 165 designates a slide plate for slidably displacing the guide plate 161 thereby to displace the cassette guide 152 in the upward/downward direction.

The present invention has been described above with respect to a preferred embodiment of the FDD including rotational drive sections and head seek mechanisms. In this connection, it should be added that a disc loading/unloading mechanism and other mechanisms are same to those of a conventional FDD. Thus, repeated description will not be required.

As is apparent from the above description, according to the embodiment of the present invention, since the FDD is constructed such that the 3.5 -inch drive section is integrated with the 5-inch drive section, informations can magnetically be recorded on and reproduced from two different kinds of FDs, i.e., a 3.5 -inch FD 30 and a 5-inch FD 40. Consequently, in contrast with the conventional FDD, information can be processed under a condition that a 3.5 -inch FD and a 5-inch FD are used simultaneously. In addition, information can be processed under another condition that a 3.5 -inch FD is combined with other kind of FD having a different diameter. The aforementioned construction should not be limited only to the FDD but it of course may be applied to other disc recording/reproducing device, e.g., an optical disc device.

Next, a control system employable for the FDD of the present invention will be described below with reference to FIG. 8 and FIG. 9.

Figure 8:
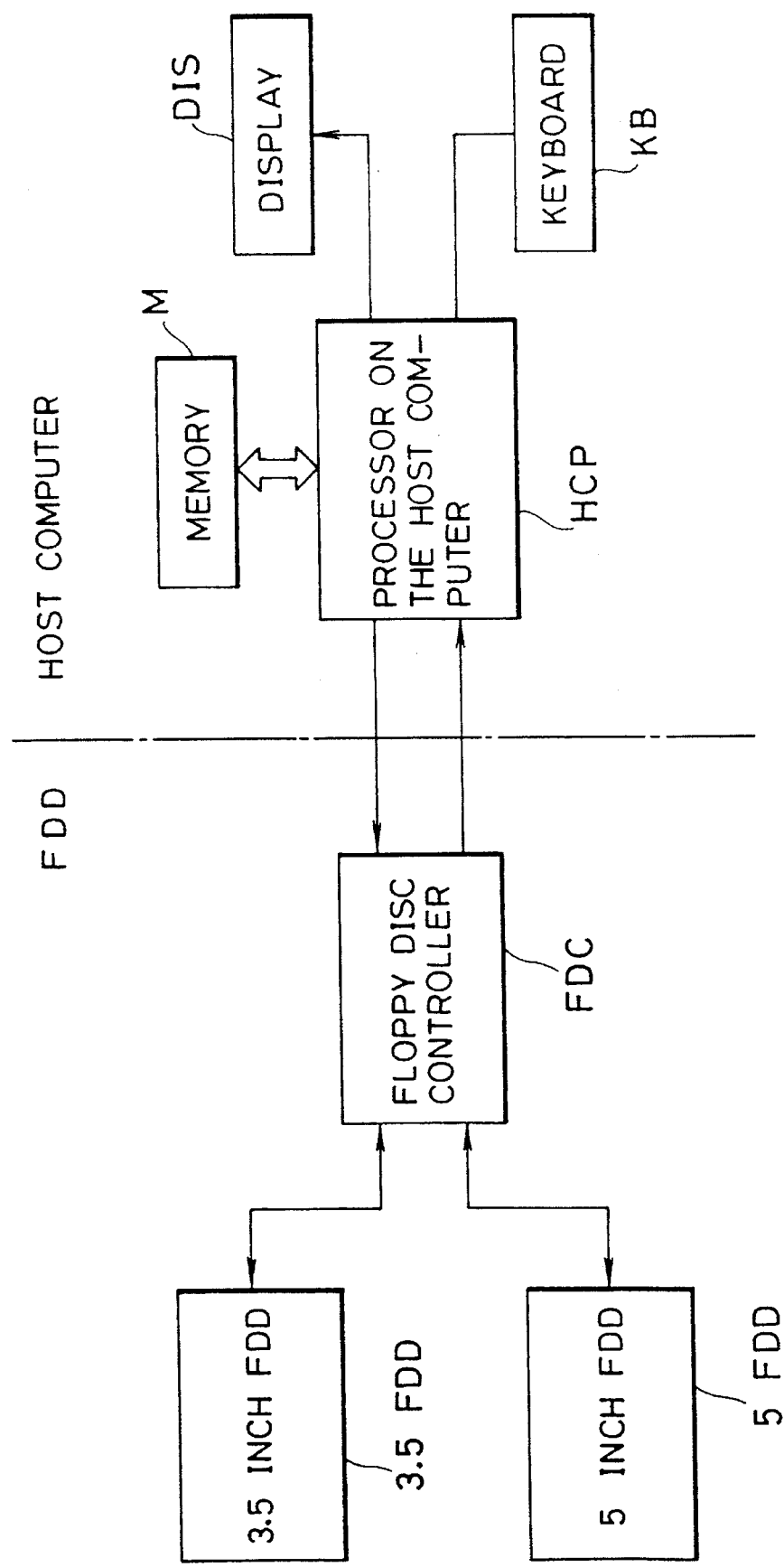
FIG. 8 is a block diagram which shows the fundamental structure of the disc drive device in FIG. 1.

FIG. 8 is a block diagram which schematically illustrates a fundamental structure of the control system for the FDD of the present invention.

In the drawing, reference character 3.5 FDD designates a 3.5 -inch floppy disc drive unit, reference character 5 FDD designates a 5-inch floppy disc drive unit, HCP designates a microprocessor on the host computer side to which the FDD of the present invention is electrically connected, DIS designates a display on the host computer side, KB designates a key board for inputting, M designates an internal memory, FDC designates a floppy disc controller for controlling the respective disc drive units in the FDD in response to various commands issued from the microprocessor HOP on the host computer side, and moreover, reading and writing information between the disc drive units and the microprocessor HCP on the host computer side, and reference character I/O designates an interface for receiving and delivering informations between the floppy disc controller FDC and the microprocessor HCP on the host computer side.

Figure 9B:
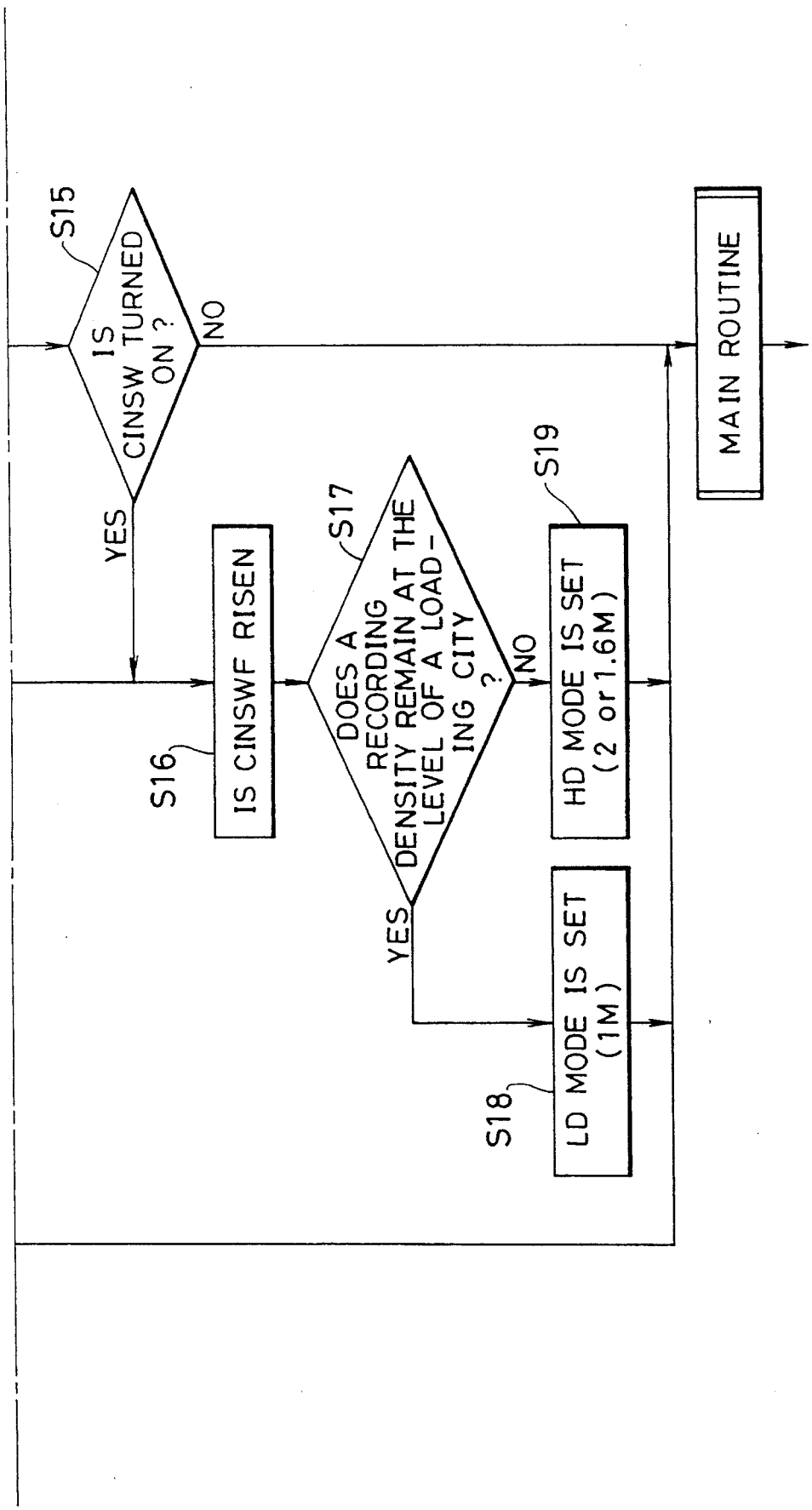

FIG. 9A and FIG. 9B show flowcharts which explain an algorithm for selecting certain drive in the floppy disc controller FDC serving as controlling means for controlling each drive unit, respectively. It should be noted that the flowcharts shown in FIG. 9A and FIG. 9B are prepared such that various kinds of controls are processed between the host computer and the floppy disc controller and a series of processings other than those shown in the drawings are executed in accordance with a main routine which is not described herein in detail.

In the drawings, reference character CINSW designates a cassette detecting switch disposed in a 3.5-inch FDD, reference character MINSW designates a cassette detecting switch disposed in a 5-inch FDD, reference character CINSWF designates a cassette-in-flag which is risen when practical installation of the 3.5-inch FDD is detected by the cassette detecting switch CINSW, and reference character MINSWF designates a media-in-flag which is risen when practical installation of a 5-inch FDD is detected by the media detecting switch MINSW. For the purpose of avoiding confusion between a 3.5-inch FD and a 5-inch FD, it is assumed that a case where a cassette is referred to represents a 3.5-inch FD and a case where a media is referred to represents a 5-inch FD.

Referring to FIG. 9A and FIG. 9B, when a controlling operation is started, the control routine goes to Step S1 at which the controller FDC examines the present operative state of the cassette-in-flag CINSWF. When the controller FDC finds that the cassette-in-flag CINSWF has been risen, the control routine goes to Step S2. However, when the controller FDC finds that the cassette-in-flag CINSWF has not been risen, the control routine goes to Step S4. At Step 102, the controller FDC examines the present operative state of a cassette-in-switch CINSW. When the controller FDC finds that the cassette-in-switch CINSWF is turned off and no cassette is mounted on the FDD, the control routine goes to Step S3 at which the cassette-in-flag CINSWF is reset. Thereafter, the control routine goes to Step S4. However, when the controller FDC finds that the cassette-in-switch CINSW is turned on and a cassette is mounted on the FDD, the control routine goes to Step S16 to be described later.

At Step S4, the controller FDC examines the present operative state of the media-in-flag MINSWF. When the controller FDC finds that the media-in-flag has been risen, the control routine goes to Step S5. However, when the controller FDC finds that the media-in-flag MINSWF has not been risen, the control routine goes to Step S7. When the controller FDC finds at Step S5 that the media-in-switch MINSW is turned on off, the control routine goes to Step S6 at which the media-in-flag MINSWF is reset. Thereafter, the control routine goes to Step S7. When the controller FDC finds at the Step S7 that the media-in-switch MINSW is turned and media in the form of magnetic discs are mounted on the FDD, the control routine goes to Step S10 to be described later.

At Step S7, the controller FDC determines to which one of the 3.5-inch FDD and the 5-inch FDD a priority order has been set. This is because in a case where magnetic discs are mounted on both of the 3.5-inch FDD and the 5-inch FDD while a power supply source is turned on or in a case where no magnetic disc is mounted on them, either of them should be selected with a priority. For this reason, determination is made with respect to the FDD having a preset priority. In practice, determination is made at Step S7, when no magnetic disc is mounted on both of the 3.5-inch FDD and the 5-inch FDD.

When the controller FDC finds at Step S7 that the FDD having a priority is not a 3.5-inch FDD but a 5-inch FDD, the control routine goes to Step S10 at which the controller FDC examines the present operative state of the media-in-switch MINSW. When the controller FDC finds at Step S10 that the media-in-switch MINSW is turned on, the control routine goes to Step S11 to be described later. However, when the controller FDC finds at Step S10 that the media-in-switch MINSW is turned off, the control routine goes to Step S11 to be described later.

When the controller FDC finds at Step S7 that the FDD having a priority is a 3.5-inch FDD, the control routine goes to Step S8 at which the controller FDC examines the present operative state of the cassette-in-switch CINSW. When the controller FDC finds at Step S8 that the cassette-in-switch CINSW is turned on, i.e., a magnetic disc is mounted on the 3.5-inch FDD, the control routine goes to Step S16. When the controller FDC finds at Step S8 that the cassette-in-switch CINSW is turned off and no magnetic disc is mounted on the 3.5-inch FDD, the control routine goes to Step S9 at which the controller FDC examines the present operative state of the media-in-switch MINSW. When the controller FDC finds at Step S9 that the media-in-switch MINSW is turned off and no media is mounted on either of the 3.5-inch FDD and the 5-inch FDD, the control routine is terminated. Then, the control routine returns to the main routine of the control system. When the controller FDC finds at Step S9 that the media-in-switch MINSW is turned on and media in the form of magnetic discs are mounted on both of the 3.5-inch FDD and 5-inch FDD, the control routine goes to Step S11.

A processing to be executed at Step S11 is a processing to be executed when the controller FDC finds at Steps S5, S10 and S9 that the media-in-switch MINSW is turned on. In practice, the controller FDC rises a flag which represents that the media-in-flag MINSWF has been risen and media in the form of magnetic discs are mounted on both of the 3.5-inch FDD and the 5-inch FDD. Then, the control routine goes to Step S12 at which the controller FDC discriminates a selection signal representing a recording density of each magnetic disc, i.e., a memory capacity of the same transmitted from the host computer which is electrically connected to the FDD of the present invention. When the controller FDC finds that the memory capacity remains at the level of a loading city which represents a memory capacity available in a 1 M bite mode, the control routine goes to Step S13. However, when the controller FDC finds that the memory capacity remains at the level of a handy city which represents a memory capacity available in a 1.6 M bit mode, the control routine goes to Step S14. At each of Step S13 and Step S14, the controller FDC sets parameters such as a frequency property of a reading/writing filter in a signal processing circuit, a motor speed or the like to a value corresponding to the magnetic disc practically mounted on the FDD. Here, it should be added that a mode selecting signal remaining at the level of each of the loading city and the handy city is transmitted from the host computer via an interface in accordance with the program prepared at the host computer side. In a case where magnetic discs are mounted on the FDD, since the controller FDC can discriminate a recording capacity of each of the magnetic discs by reading signals recorded on each magnetic disc, an adequate selecting signal can subsequently be transmitted to the host computer side by allowing the controller FDC to discriminate the recording density while the magnetic discs are mounted on the FDD.

It should be noted that while the memory capacity remains at the level of a handy city which represents a memory capacity available in a 1.6 M bite mode, the motor is rotated at a speed of 360 rpm, and while the memory capacity remains at the level of a loading city which represents a memory capacity available in a 1 M bite mode, the motor is rotated at a speed of each of 300 rpm and 360 rpm.

After a selecting operation for selecting the kind of magnetic disc is completed, the control routine terminates its flowchart. Then, the control routine returns to the main routine of the control system.

Additionally, at Step 15, the controller FDC discriminates the present operative state of the cassette-in-switch CINSW. In practice, Step S15 is executed in a case where the controller FDC finds at Step S7 that the 5-inch FDD has a priority, and moreover it finds at Step S10 that the media-in-switch MINSW is turned off and no 5-inch FD is mounted on the FDD. In other words, when the controller FDC finds that the 5-inch FDD has a priority but no 5-inch FD is mounted on the FDD, it discriminates whether a 3.5 -inch FD is mounted on the FDD or not.

When the controller FDC finds at Step S15 that the cassette-in-switch CINSW is turned off, this represents that no magnetic disc is mounted on each FDD. Thus, the control routine is terminated. Then, the control routine returns to the main routine of the control system.

When the controller FDC finds at Step S15 that the cassette-in-switch CINSW is turned on and a 3.5-inch FD is mounted on the FDD, the control routine goes to Step S16 at which the cassette-in-flag CINSWF is risen. Subsequently, the control routine goes to Step S17 at which the controller FDC detects in response to a signal transmitted via the interface or with the aid of a detecting section of each cassette whether each magnetic disc has a memory capacity remaining at the level of a loading city or a handy city. When the controller FDC detects at Step S17 that each magnetic disc mounted on the FDD has a memory capacity remaining at the level of a loading city available in a 1 M bite mode, the control routine goes to Step S18. When the controller FDC detects at Step S17 that each magnetic disc mounted on the FDD has a memory capacity remaining at the level of a handy city available in a 1.6 M bite mode or a 2 M bite mode, the control routine goes to Step S19. At each of Step S18 and Step S19, the controller FDC sets parameters such as a frequency property of a filter in a signal processing circuit, a motor speed or the like to a value corresponding to the magnetic disc mounted on the FDD.

A series of processings as mentioned above is summarized in the following. First, the controller FDC detects whether a cassette is mounted on the 3.5-inch FDD or not (Steps S1 and S2). When it is found that a cassette is mounted on the 3.5-inch FDD, the controller FDC discriminates the recording density of a magnetic disc in the cassette (Step S17). Subsequently, the controller FDC sets a motor speed to a value corresponding to the magnetic disc (Steps S18 and S19).

When it is found that no 3.5-inch FD is mounted on the FDD, the controller FDC detects whether a 5-inch FD is mounted on the FDD or not (Steps S4 and S5). When it is found that a 5-inch FD is mounted on the FDD, the controller FDC discriminates the recording density of the magnetic disc (Step S12). Subsequently, the controller FDC sets a motor speed to a value corresponding to the magnetic disc (Steps S13 and S14).

When it is found from the results derived from processings executed at Step S1 to Step S4 that no magnetic disc is mounted on either of the 3.5-inch FDD and the 5-inch FDD, the control routine goes to Step S7 at which the controller discriminates either of the 3.5-inch FDD and the 5-inch FDD having a higher priority order. Subsequently, the controller FDC detects based on the priority order whether a magnetic disc is mounted on the FDD or not. When it is detected that a magnetic disc is mounted on the FDD, the controller FDC discriminates a recording density corresponding to the magnetic disc (Steps S12 to S14). In addition, the controller FDC sets a motor speed to a value corresponding to a format of the magnetic disc (Steps S17 to S19).

After a selecting operation for selecting the kind of each magnetic disc is completed, the control routine is terminated. Then, the control routine returns to the main routine of the control system. Consequently, different kinds of FDDs for a 3.5-inch FD and a 5-inch FD can be controlled by a common controller to the 3.5-inch FD and the 5-inch FD in the same manner as in a case where a single FDD is controlled.

According to the embodiment of the present invention, each of the 3.5-inch FD and the 5-inch FD are detected by an individual detection switch. Alternatively, it may be detected by using an index signal which is generated at every rotation of the motor.

Next, an FDD in accordance with another embodiment of the present invention will be described below with reference to FIG. 10 and FIG. 11.

Figure 10A:
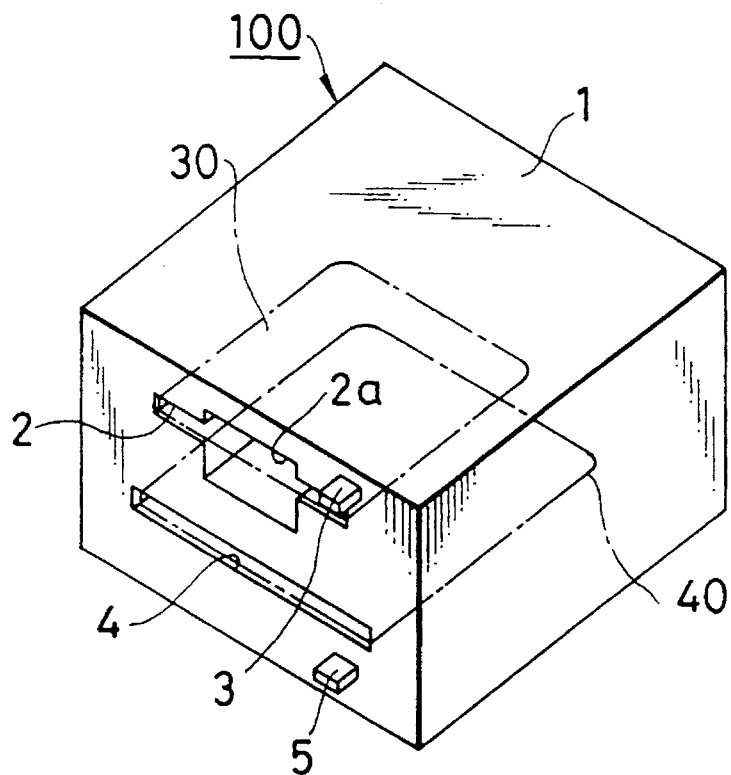
FIG. 10A is a perspective view which shows the whole appearance of a disc drive device in accordance with another embodiment of the present invention.
Figure 10B:
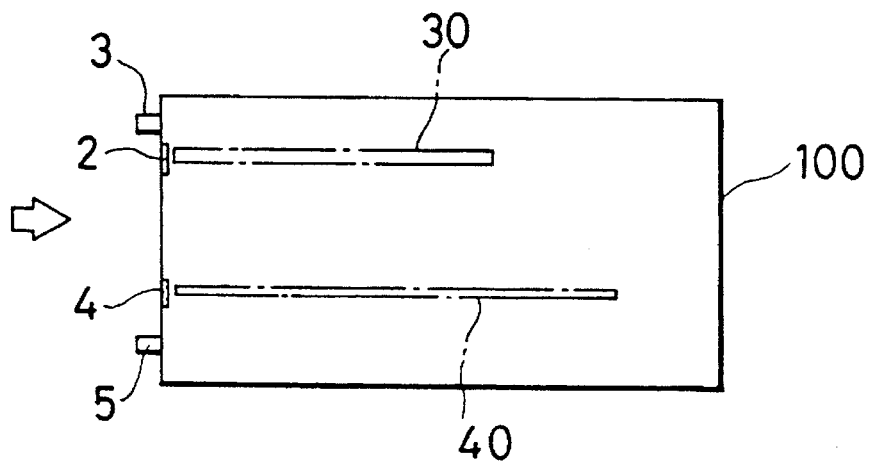
FIG. 10B is a side view of the disc drive device in FIG. 10A.

FIG. 10A is a perspective view of the FDD in accordance with this embodiment of the present invention, particularly illustrating the whole appearance of the same, and FIG. 10B is a side view of the FDD in FIG. 10A.

The FDD generally designated by reference numeral 100 is constructed in an integral structure including an FDD for performing a recording/reproducing operation using a 3.5-inch FD 30 shown in FIG. 6 and an FDD for performing a recording/reproducing operation using an FD 40 shown in FIG. 7. As is best seen in FIG. 10A, a disc insert slit 2 for inserting a 3.5-inch FD therethrough and a disc insert slit 4 for inserting a 5-inch FD therethrough are formed on the front panel of an exterior cover 1 of the FDD 100. In addition, an eject button 3 for ejecting the 3.5-inch FD from the disc insert slit 2 and an eject button 5 for ejecting the 5-inch FD from the disc insert slit 4 are arranged on the front panel of the exterior cover 1. To facilitate insertion of the 3.5-inch FD, an opening portion 2a having a wide width is additionally formed at the central part of the disc insert slit 2 for a 3.5-inch FD. With such construction as mentioned above, the FDD 100 serves to magnetically record or reproduce informations using the 3.5-inch FD inserted through the disc insert slit 2 and the 5-inch FD inserted through the disc insert slit 4.

According to the embodiment of the present invention, as shown in FIG. 10, the FDD 100 is designed such that while two FDs each having a different size are inserted through the respective disc insert slits 2 and 4, their rear edges as seen in the direction of insertion of the FDs are aligned with each other on the disc insert slit side. With this construction, the rear edges of the respective FDs are located at a same position on the front panel side, resulting in a maneuverability of the FDD 100 being improved.

Figure 11:
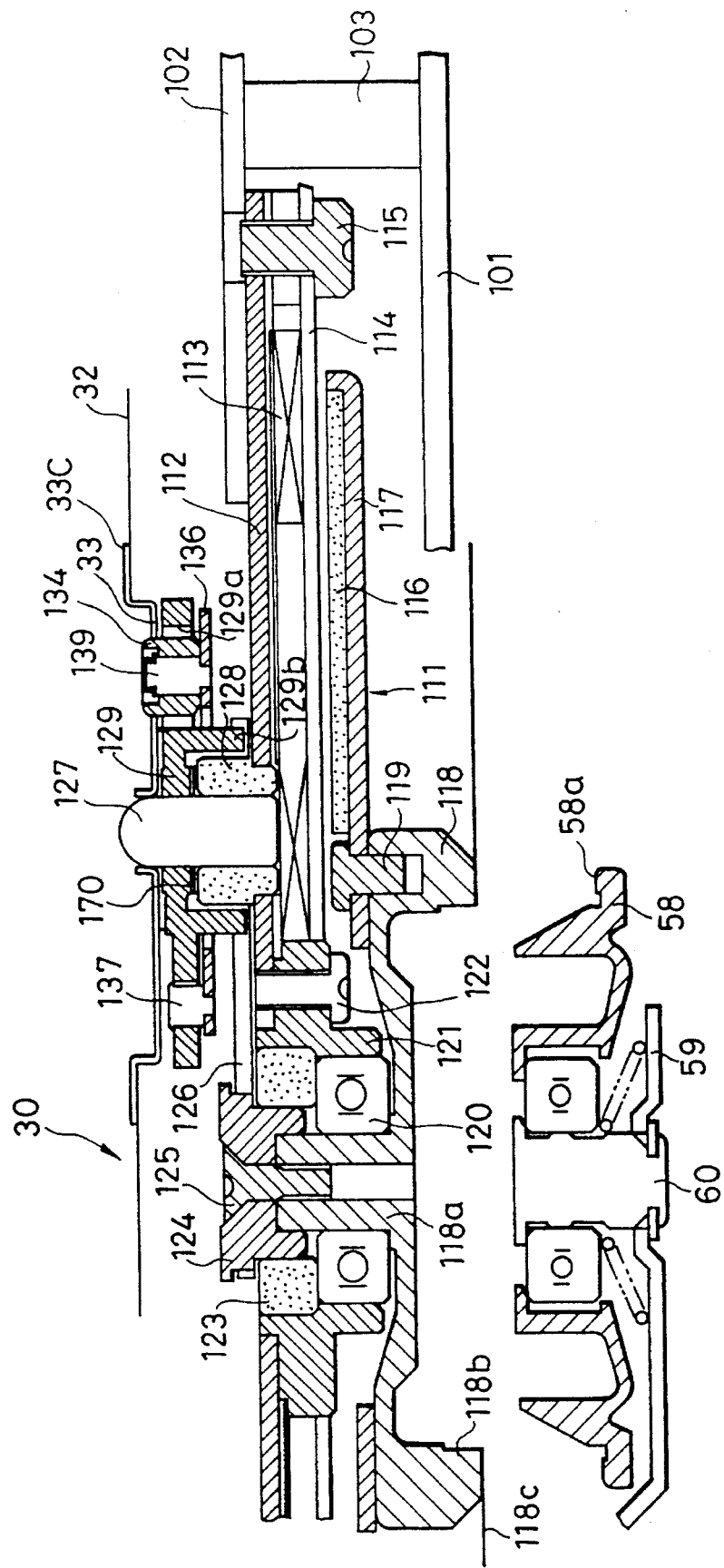
FIG. 11 is a fragmentary sectional side view of the disc drive device in FIG. 10A, particularly showing the structure of rotational driving sections for two floppy discs each having a different diameter.

In addition, the FDD 100 includes a drive section for performing a recording/reproducing operation using a 3.5-inch FD (hereinafter referred to simply as a 3.5-inch drive section) and a drive section for performing a recording/reproducing operation using a 5-inch FD (hereinafter referred to simply as a 5-inch drive section), and a rotational drive section for rotationally driving a 3.5-inch FD and a 5-inch FD is constructed in operative association with the 3.5-inch drive section and the 5-inch drive section, as shown in FIG. 11.

In FIG. 11, reference numerals 101 and 102 designate a base for operatively supporting components constituting the FDD 100. According to the embodiment of the present invention, a 5-inch drive mechanism is mounted on the base 101, while a 3.5-inch drive mechanism is mounted on the base 102. The bases 101 and 102 are connected to each other via a plurality of connecting members 103 thereby to provide a single integral base.

Next, the structure of a driving motor 111 will be described below. A member designated by reference numeral 112 is a stator fixedly mounted on the base 102 by employing a method which is not described herein for the purpose of simplification. A driving coil 113 immovably mounted on a printed circuit board 114 fixed to the stator 112 with the aid of screws 115 is arranged on the stator 112 with an electrical insulating layer interposed therebetween.

A stator section is constituted by the aforementioned members. In addition, a rotor section including a driving motor 111 is arranged opposite to the stator section. The rotor section is essentially composed of a rotor 117 and a permanent magnet 116 fixedly mounted on the rotor 117, and the magnet 116 is arranged opposite to the coil 113 with a predetermined distance therebetween. A spindle 118 for rotationally driving a 5-inch FD is fixed to the rotor 117 with the aid of screws 119, and the spindle 118 is rotatably supported by a bearing 120 which is held in a boss 121 fixedly secured to the stator 112 with the aid of screws 122. In FIG. 11, reference numeral 124 designates a pulley having a belt 126 extending therearound so as to allow rotation of the spindle 118 to be transmitted via the belt 126 to a spindle hub 129 to serve as a rotational drive mechanism to be described later for a 3.5-inch FD. The pulley 124 is rotatably held on the boss 121 via a bearing 123. The pulley 124 is fitted onto a boss portion 118a of the spindle 118 with the aid of a screw 125.

On the other hand, a bearing 128 is fitted into the stator 112 so that a rotational drive mechanism for rotationally driving a 3.5-inch FD 30 is rotatably supported by the bearing 128. The rotational drive mechanism is essentially composed of a spindle shaft 127 for holding a 3.5-inch FD 30 in position, a spindle hub 129 fixedly mounted on the spindle shaft 127 and a positioning pin 134 for driving the 3.5-inch FD 30 while maintaining a proper position of the same. The spindle shaft 127 is fitted into a square hole 33a of the 3.5-inch FD 30. The spindle hub 129 is molded of a synthetic resin containing pulverized magnetic material to exhibit an integral structure, and the upper surface of the spindle hub 129 is magnetized to provide an attractive magnet portion for firmly holding a center hub 33 of the 3.5-inch FD 30 by the magnetic attractive force derived from the spindle hub 129. A support plate 136 made of a magnetic metallic material is displaceably secured to the lower surface of the spindle hub 129 in such a manner its one end is immovably held by a boss 137 fixed to the spindle hub 128 and its free end holds a positioning pin 134 rotatably supported by a shaft 138 fixed to the support plate 136. The positioning pin 134 is projected upward of the spindle hub 129 through a hole 129a of the same while it is normally biased in the upward direction as seen in FIG. 11 by the magnetic attractive force of the spindle hub 129.

A pulley 129b is integrated with the lower part of the spindle 129 so as to allow the belt 126 to extend around the pulley 129b. Thus, the belt 126 is stretched between the pulley 129b of the spindle hub 129 and the pulley 124 while extending around the both pulleys 129b and 124 in the above-described manner. As the motor 11 is rotationally driven, a rotational force derived from the spindle 118 and the pulley 124 integrated with the spindle 118 is transmitted to the spindle hub 129 via the belt 126 so as to rotate the spindle 129.

With such construction as mentioned above, a mounting/holding operation for magnetic discs 32 and 42 in the 3.5-inch FD 30 and the 5-inch FD 40, i.e., a chucking/clamping operation for the same is performed in the following.

First, a chucking operation to be performed for the 3.5-inch FD 30 will be described below. As a loading mechanism (not shown) is actuated, the 3.5-inch FD 30 is placed on the spindle 129. Then, the spindle shaft 127 is fitted into the square hole 33a of the center hub 33 so that the center hub 33 made of a magnetic metallic material is firmly placed on the spindle hub 129 by the magnetic attractive force derived from the spindle hub 129. As the motor 111 is rotationally driven, a rotational force of the motor 111 is transmitted to the pulley 129b of the spindle shaft 129 via the rotor 117, the spindle 118, the pulley 124 and the belt 126, whereby the positioning pin 134 is rotated. When the position of the positioning pin 134 is correctly aligned with the position of a hole 33b on the center hub 33, the positioning pin 134 is fitted into the hole 33b to come in engagement with the same. As the inner edge of the hole 33b is squeezed by the positioning pin 134, the hole 33a of the center hub 33 is brought in engagement with the spindle shaft 127 while centering the center hub 33, i.e., the magnetic disc 32 of the 3.5-inch FD 30. As a result, the center hub 33 is held correctly. In other words, the magnetic disc 32 of the 3.5-inch FD 30 is correctly placed on the spindle hub 129.

Next, a clamping operation to be performed for a magnetic disc 42 of the 5-inch FD 40 will be described below.

As a loading mechanism (not shown) is actuated, the inner peripheral edge part of an opening portion 42a located at a center of the magnetic disc 42 of the 5-inch FD 40 comes in contact with a lower end surface 118c of the spindle 118.

Subsequently, as a clamping mechanism (not shown) is actuated, a collet 58 serving as a clamp member is displaced from the lower side as seen in FIG. 11 in the upward direction until it is fitted into a cylindrical recess 118b of the spindle 118 through a central opening portion 42a of the magnetic disc 42. As the inner periphery of the opening portion 42a of the magnetic disc 42 is squeezed by the collet 58, the magnetic disc 42 is correctly centered. In addition, a flange portion 58a of the collet 58 serves to allow the inner peripheral part of the opening portion 42a of the magnetic disc 42 to come in close contact with the lower surface 118c of the spindle 118, causing the magnetic disc 42 of the 5-inch FD 40 is clamped between the collet 58 and the spindle 118.

While the magnetic disc 32 of the 3.5-inch FD 30 is held beneath the spindle 118 and the magnetic disc 42 of the 5-inch FD 40 is held on the spindle 129 in the above-described manner, the motor 111 is rotationally driven thereby to rotate the magnetic discs 32 and 42 of the 3.5-inch FD 30 and the 5-inch FD 40. Subsequently, a magnetic head (not shown) for the magnetic disc 32 is brought in slidable contact with the upper surface of the magnetic disc 32 and another magnetic head (not shown) for the magnetic disc 42 are likewise brought in slidable contact with the lower surface of the magnetic disc 42 so that informations are recorded on or reproduced from the magnetic discs 32 and 42.

While the rotational drive section for the FDD in accordance with the embodiment of the present invention has been described above, a head seek mechanism, a disc loading mechanism and a disc ejecting mechanism for the FDD are constructed in the entirely same manner as those in accordance with the preceding embodiment of the present invention. Thus, repeated description on these mechanisms will not be required.

Although the present invention has been described above with respect to two preferred embodiments thereof, it should of course be understood that the present invention should not be limited only to these embodiments but various changes and modifications may be made without departure from the scope of the invention as defined by the appended claims.

What is claimed is:

1. A disc drive device having a front panel formed with a first slit and a second slit, comprising:

a base;

a first rotary member and a second rotary member each rotatably supported on said base, a first chucking mechanism for holding a first kind of disc-shaped recording medium while coinciding a rotational center of said first kind of recording medium with a rotational center of said first rotary member, said first chucking mechanism being arranged at one end of said first rotary member;

a second chucking mechanism for holding another second kind of disc-shaped recording medium having a larger diameter and disc formatting different from that of the first kind of recording medium while coinciding a rotational center of the second kind of recording medium with a rotational center of said second rotary member, said second chucking mechanism being arranged at one end of said second rotary member;

single driving motor for driving said first rotary member and said second rotary member; and said first rotary member and said second rotary member being spaced away from each other by a first distance substantially equal to a half of a difference in diameter between the first kind of recording medium and second kind of recording medium so that a second distance between said first kind of recording medium and the first slit of said front panel is substantially equal to a third distance between said second kind of recording medium and the second slit of said front panel.

2. The disc drive device as claimed in claim 1, wherein said single drive motor is provided with a single driving power supply source for directly or indirectly driving either of said first rotary member and said second rotary member and rotation transmitting means for transmitting rotation of one of said rotary members to the other one of the same.

3. The disc drive device as claimed in claim 2, wherein one of said recording mediums is a floppy disc having a diameter of 5.25 inches and the other one of the same is a floppy disc having a diameter of 3.5 inches.

4. The disc drive device as claimed in claim 3 further comprising insert slits for inserting said floppy disc having a diameter of 5.25 inches and said floppy disc having a diameter of 3.5 inches therethrough, said first rotary member holding said floppy disc having a diameter of 3.5 inches placed thereon being located adjacent to said insert slits.

5. A disc drive device having a front panel formed with a first slit and a second slit, comprising:

a base;

a first rotary member and a second rotary member each rotatably supported on said base, a first chucking mechanism for holding a first kind of disc-shaped recording medium while coinciding a rotational center of said first kind of recording medium with a rotational center of said first rotary member, said first chucking mechanism being arranged at one end of said first rotary member;

a second chucking mechanism for holding another second kind of disc-shaped recording medium having a larger diameter and disc formatting different from that of the first kind of recording medium, while coinciding a rotational center of the second kind of recording medium with a rotational center of said second rotary member, said second chucking mechanism being arranged at one end of said second rotary member;

single driving motor for driving said first rotary member and said second rotary member;

said first rotary member and said second rotary member being spaced away from each other by a first distance substantially equal to a half of a difference between the diameter of the first kind of recording medium and the diameter of the second kind of recording medium, so that the first and second rotary members substantially equalize distances from the respective first and second slits on the front panel to each of the disc-shaped recording media in the disc drive device;

a second distance between said first kind of recording medium and the first slit of said front panel when the first kind of disc-shaped recording medium is held by said first chucking mechanism, is substantially equal to a third distance between said second kind of recording medium and the second slit of said front panel when the second kind of disc-shaped recording medium is held by said second chucking mechanism; and said second kind of disc-shaped recording medium has a larger diameter than the first kind, the single driving motor directly drives said second chucking mechanism which holds the second kind of disc-shaped recording medium, and said first chucking mechanism is driven by said single driving motor via a transmitting means for transmitting rotation.

6. A disc drive device as claimed in claim 5, wherein said first kind of disc-shaped recording medium is a 3.5-inch floppy disc, and said second kind of disc-shaped recording medium is a 5.25-inch floppy disc.

7. A disc drive device as claimed in claim 6, wherein said slit for said first kind of disc-shaped recording medium is located above said slit for said second kind of disc-shaped recording medium.

8. A disc drive device as claimed in claim 5, wherein said single drive motor is directly connected to said second rotary member.

9. A disc drive device as claimed in claim 8, further comprising means for transmitting rotation of said second rotary member to said first rotary member.

* * * * *